Jan. 13, 1931. J. F. O'CONNOR 1,788,539
ANTIFRICTION JOURNAL BEARING
Original Filed Sept. 21, 1927
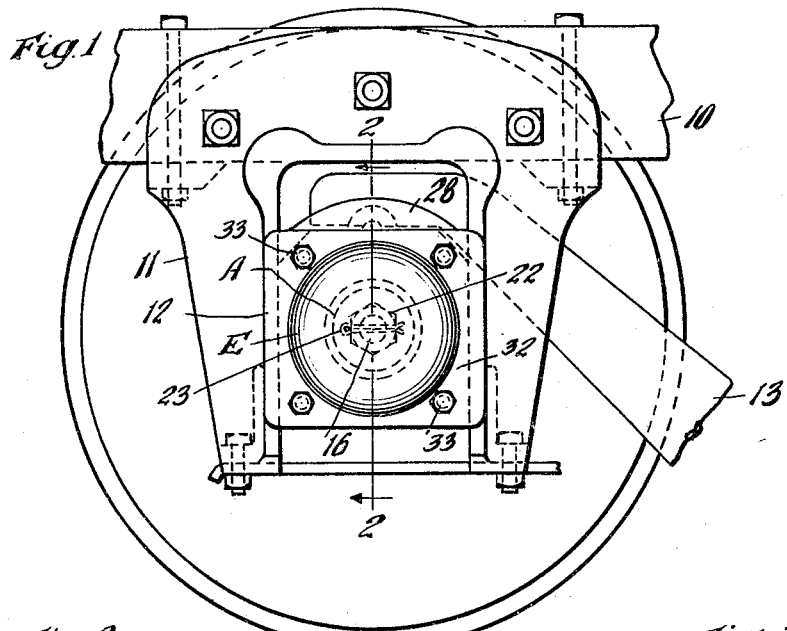
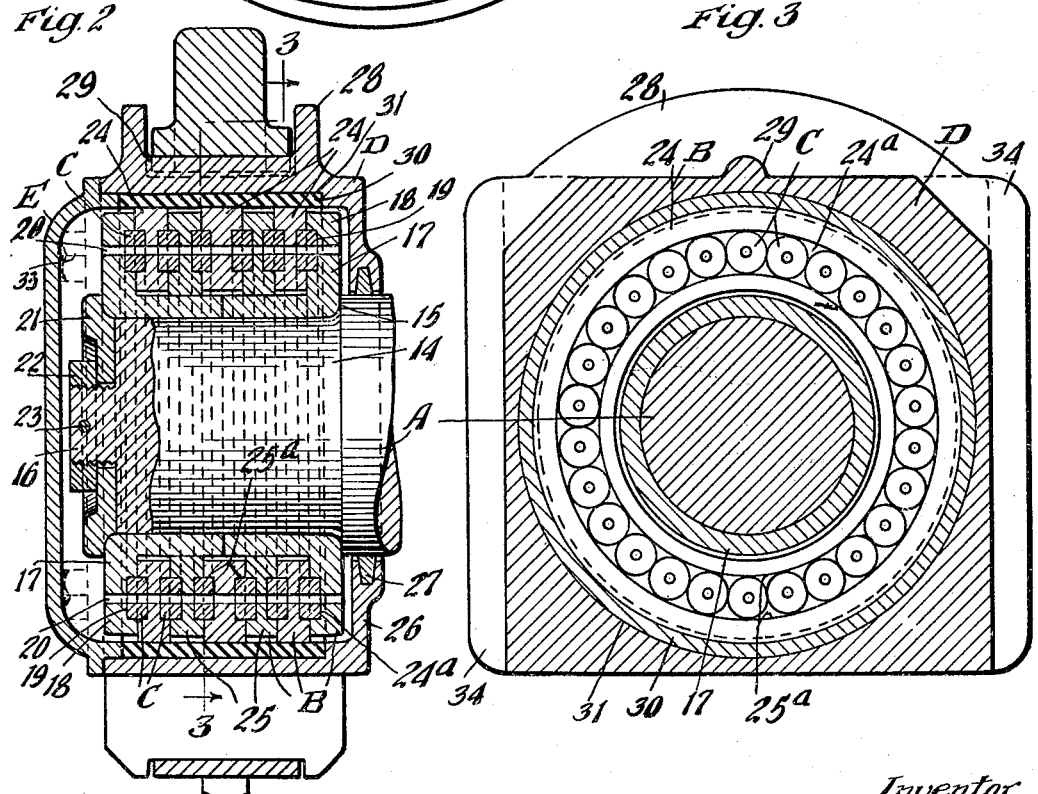
Witness
Wm. Geiger
Inventor
John F. O'Connor
By George I. Haight
His Atty.

Patented Jan. 13, 1931

1,788,539

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

ANTIFRICTION JOURNAL BEARING

Application filed September 21, 1927, Serial No. 220,902. Renewed July 14, 1930.

This invention relates to improvements in anti-friction journal bearings.

An object of the invention is to provide an anti-friction bearing arrangement more particularly adapted for use in connection with the journal boxes and journals of railway cars, and wherein the component parts of the arrangement are so disposed that the load imposed upon the journal box is transmitted to the journal in such manner that the anti-friction elements remote from the point of application of the load, operate to sustain part of the load at all times, as distinguished from anti-friction bearings wherein only the anti-friction elements interposed between the point of application of the load and the journal support the entire load, while the anti-friction elements at remote points sustain no load.

A more specific object of the invention is to provide an anti-friction arrangement of the character referred to, wherein a plurality of race rings are provided, certain of which are mounted on the journal, and other of which are spaced from the journal and carried by the journal box, the two sets of race rings being disposed in overlapping relation and provided with raceways adapted for the reception of the anti-friction elements so that the latter are arranged vertically in shear.

Another object of the invention is to provide a construction wherein all of the race rings, necessary to the operation of the device, may be completely assembled with reference to the journal and held in position thereon by a lock nut.

Other and further objects of the invention will more clearly appear from the description and claims hereinafter following.

In the drawings forming part of this specification Figure 1 is a side elevational view of a fragment of a railway car truck, showing a truck pedestal member and a journal box, embodying the invention, mounted in the pedestal member. Figure 2 is a transverse, vertical, sectional view, corresponding substantially to the line 2—2 of Figure 1. And Figure 3 is a vertical, sectional view, corresponding substantially to the line 3—3 of Figure 2.

As shown in the drawings 10 represents a fragment of a body portion of a car truck, and 11 represents a common type of pedestal member mounted thereon, having the usual spaced jaws, between which is slidably disposed a journal box 12 embodying the invention. The numeral 13 indicates one end of an equalizer bar which bears upon the top of the journal box 12 and transmits the load from the frame of the truck to the top of the journal box, which in turn transmits the load to the axle as will be readily understood.

The invention contemplates broadly the provision of a journal A, race rings B, anti-friction elements C, journal box proper D and journal box cap E.

The journal A is of special formation, having a reduced cylindrical portion 14 providing an annular shoulder 15 at its inner extremity, while the outer end of the cylindrical portion 14 is still further reduced to provide a projection 16, threaded on its exterior surface. Mounted upon the cylindrical section 14 of the journal is a pair of oppositely disposed collars 17—17, each of said collars at its outer end being provided with an annular flange 18. Each annular flange 18 on its inner surface is provided with an annular groove indicated at 19, and with oil holes indicated at 20 which extend from the outer side of the flange into the groove. The collars 17—17 are held in position by means of a washer 21 which bears against the outer collar 17 forcing the same inwardly against the inner collar 17 which abuts against the shoulder 15 on the axle, the washer 21 being held in position by means of a nut 22 threaded upon the cylindrical portion 16 on the journal, said nut being locked in position by a pin 23.

Disposed between the flanges 18—18 of the collars 17—17 are the race rings B. These rings are divided into two sets, those indicated at 24—24 which co-operate with the journal box D and are spaced from the collars 17—17 and those which are carried by the collars 17—17, and indicated at 25, the rings 24 and 25 being disposed in alternate overlapping relation. Each of the rings 24 and 25 is provided on its opposite surfaces with annular grooves, the annular grooves of the adjacent rings 24 and 25 registering and together providing annular raceways adapted for the reception of an annular series of the anti-friction elements C. Each of said annular grooves is defined by a bottom wall 24a, and side walls 25a, the walls 25a extending substantially at right angles to the plane of each ring. The anti-friction elements C are in the form of rollers, and are so proportioned that when the rings 24 and 25 are in operative position, each roller, of each annular series of rollers, is disposed approximately half in the annular groove in one of the rings 24, and approximately half in the annular groove of the adjacent ring 25, there being six annular series of rollers, as shown in Figure 2, each series being arranged between the alternately disposed rings 24 and 25 and between the end rings 24 and the annular flanges 18 on the collars 17.

The journal box D comprises side, top, bottom and rear walls, the rear wall 26 having an annular aperture fitting about the larger portion of the axle, the edge of the wall defining said opening having packing material 27 arranged in a groove therein. The top wall of the journal box D is provided with the usual spaced flanges 28—28, and an equalizer seat 29, for the reception of the end of the equalizer bar 13. The journal box D is provided with a central annular recess 31 in which is placed an annular liner 30 upon which the circumferential peripheries of the race rings 24 bear.

The journal box D has its open end closed by means of the cap E. The cap E is provided with flanges 32 through which bolts 33 are extended into the body portion of the journal box for securing the cap rigidly in position, the flanges 32 co-operating with the flanges 34 on the journal box D to provide guide means for maintaining the journal box in slidable relation with the jaws of the pedestal member 11.

In assembling the construction, the journal box D, with the liner 30, and without the cap E, is first placed in position on the axle. The race rings 24 and 25, and the anti-friction elements C, are then placed in position with respect to the collars 17—17, this being permitted by reason of the fact that the collars may be separated when desired. After the race rings and anti-friction elements are in position with respect to the collars 17—17, the collars are slipped onto the cylindrical portion 14 of the journal and into the liner 30, the washer 21 then being applied, and the nut 22 screwed into place, clamping the collars between the shoulder 15 on the axle and the washer 21. The cap E is then applied and the journal box is thus made ready for operation in the pedestal jaws of the pedestal member 11.

In operation, the load from the equalizer bar 13 is transmitted to the top of the journal box, thence to the annular liner 30, and through said annular liner to the upper ends of the race rings 24; the load is then transmitted through the anti-friction elements C to the race rings 25, which bear upon the collars 17—17 which bear directly on cylindrical portion 14 of the axle. Due to the imposition of the load upon the rings 24, and the relatively fixed condition of the rings 25 with reference to the journal, the rings 24 move relatively to the rings 25 to a slight extent causing the angular walls of the annular grooves of the rings to bear upon the anti-friction elements at points remote from the elements directly interposed between the journal box and axle at the point of application of the load, more particularly at the bottom of the bearing, as shown in Figure 2. Under normal conditions, and upon relative movement between the rings 24 and 25 other than in a vertical direction, the load is transmitted in the same manner through the race rings and the annular series of rollers.

I have herein shown and described what I now consider the preferred manner of carrying out my invention, but the same is merely illustrative and I contemplate all changes and modifications that come within the scope of the claims appended hereto.

I claim:

1. In a construction of the character described, the combination with a journal box and a journal; of a plurality of race rings disposed about said journal and having their outer peripheries bearing on said journal box, while their inner peripheries are spaced from said journal; a plurality of journal race rings fixed on said journal and projecting between the journal box race rings so as to be relatively movable with respect thereto, the outer peripheries of said journal race rings being spaced from the walls of the journal box, each of said journal box race rings and each of said journal race rings, having an annular groove therein, presenting opposed curved walls forming raceways; and a plurality of series of anti-friction elements disposed between the journal box race rings and the journal race rings, each of said anti-friction elements of each series projecting partially into the annular grooves of the two adjacent journal box and journal race rings and cooperating with both of the raceways of each groove.

2. In a construction of the character described, the combination with a journal box and a journal; of a plurality of race rings disposed in said journal box and extending about said journal and having their inner peripheries spaced from the latter, each of said race rings being provided with annular grooves on opposite sides thereof, each groove presenting opposed curved walls disposed in curved planes substantially concentric to the axis of the journal; a plurality of journal race rings secured to said journal and projecting between the journal box race rings, said journal race rings having their outer peripheries spaced from the journal box, and each journal ring being provided with anular grooves on the opposite sides thereof, each groove having opposed curved walls surrounding the axis of the journal; and a plurality of annular series of cylindrical rollers, having flat ends, each of said rollers being disposed partly in the annular groove of one of the journal box race rings and partly in the corresponding annular groove of the adjacent journal race ring, and adapted to cooperate with both of the opposed walls of each groove.

3. In a construction of the character described, the combination with a journal; of a plurality of journal race rings disposed about said journal, each of said rings being provided with annular grooves on opposite sides having spaced opposed curved bearing surfaces surrounding the axis of the journal, said journal race rings being arranged in spaced relation; additional race rings each having grooves corresponding to the grooves in said journal race rings each having spaced opposed curved bearing surfaces surrounding the axis of the journal, said last named race rings, and projecting in the spaces between said journal race rings, but having their inner peripheries spaced from said journal, and having their outer peripheries projecting beyond the outer peripheries of said journal race rings; anti-friction means interposed between the journal race rings and the additional race rings, said means comprising a plurality of elements, each of which is disposed partly within one of the grooves of one of the journal race rings and partly in the groove of the adjacent additional race ring between the spaced bearing surfaces of each of said grooves respectively; and means for holding all of said race rings and anti-friction means in operative relation with respect to said journal.

4. In a construction of the character described, the combination with a journal; of a split collar having annular flange members at its opposite ends, and intermediate cylindrical portions, said collar being detachably fixed upon said journal, the flange members on said collar being provided on their inner surfaces with annular grooves presenting opposed curved bearing surfaces forming inner and outer raceways; a plurality of journal race ring members disposed about the cylindrical portions of said collar in spaced relation and having their inner peripheries bearing on said collar, each of said journal race ring members being provided with annular grooves upon opposite sides presenting opposed curved bearing surfaces forming inner and outer raceways; and additional race ring members disposed between the journal race ring members and between the latter and the opposite end flange members on said collar; and anti-friction elements arranged between the journal race ring members, additional race ring members, and flange members of said collar, said anti-friction means including a plurality of elements, each of which is disposed partly in the groove of one of said members and partly in the groove of the adjacent member.

5. In an anti-friction journal bearing, the combination with two relatively rotatable members, one of said members being in the form of a journal and disposed within the other member; of anti-friction means interposed between said members, including an annular series of anti-friction devices having rolling movement about said journal member and cooperating race elements mounted on said members respectively, each of said race elements having spaced opposed annular walls disposed about said journal member, said spaced walls of each element forming inner and outer raceways, said series of anti-friction devices being disposed between said race elements of each of said devices projecting partly between the inner and outer raceways of one of said elements and partly between the inner and outer raceways of the other adjacent element and cooperating with both the inner and outer raceways of each element, the race element on said journal member being spaced from the other member and the race element on the last named member being spaced from the journal member, whereby a load acting on one of said members is transmitted to the other member through said race elements and anti-friction devices at opposite sides of the axis of said journal member.

In witness that I claim the foregoing I have hereunto subscribed my name this 17th day of September 1927.

JOHN F. O'CONNOR.